May 12, 1925.                      1,537,674
S. A. HOGE
VEHICLE WHEEL
Filed July 8, 1921
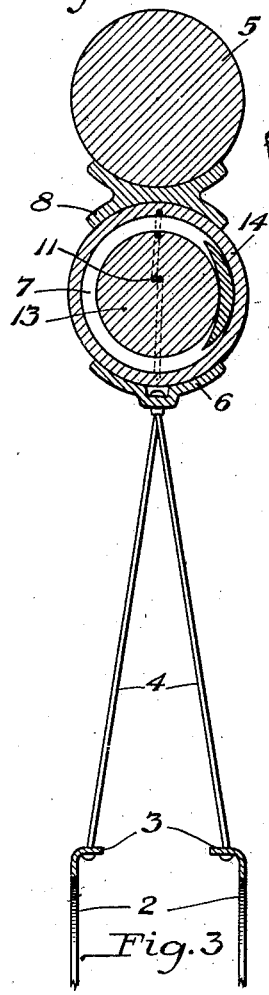
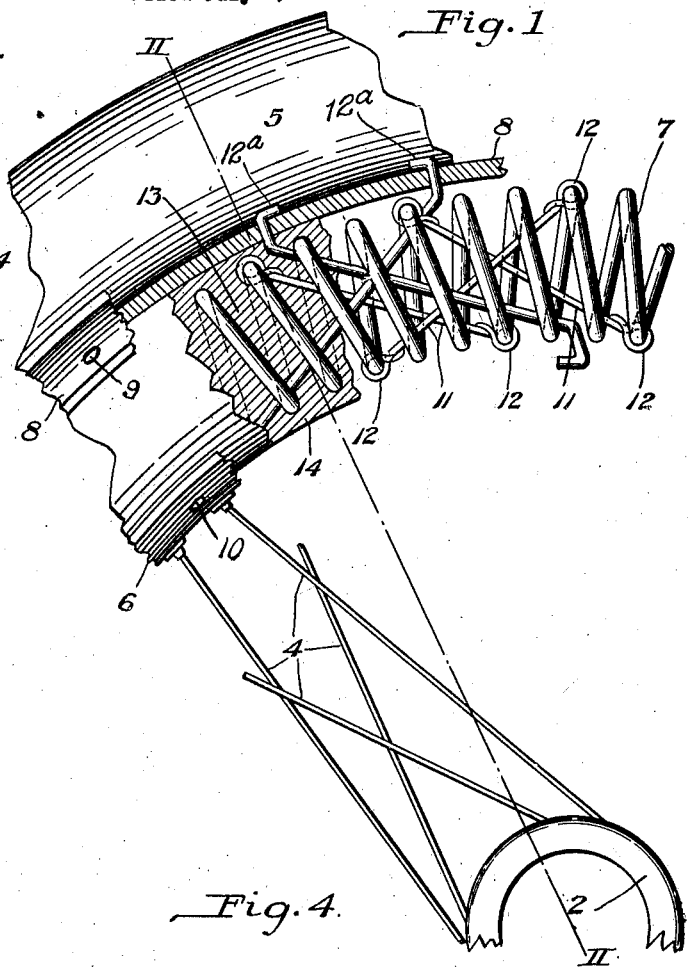
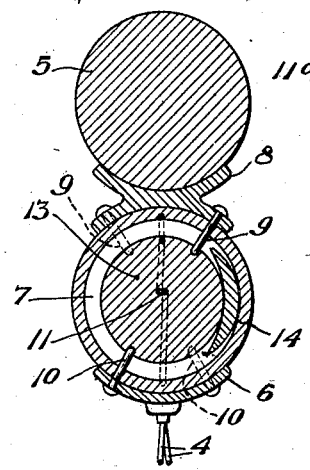
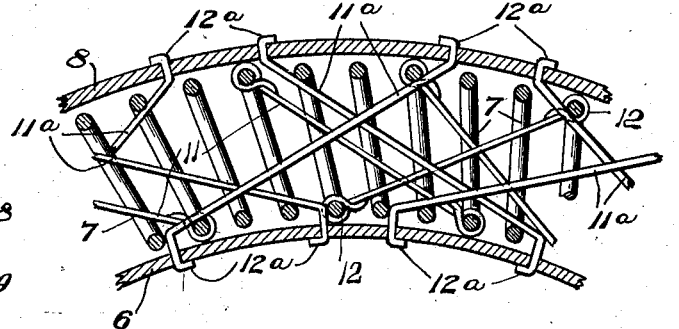
INVENTOR.
Smith A. Hoge
by C. M. Clark
Atty.

Patented May 12, 1925.

1,537,674

UNITED STATES PATENT OFFICE.

SMITH A. HOGE, OF RICES LANDING, PENNSYLVANIA.

VEHICLE WHEEL.

Application filed July 8, 1921. Serial No. 483,150.

*To all whom it may concern:*

Be it known that I, SMITH A. HOGE, a citizen of the United States, residing at Rices Landing, in the county of Greene and State of Pennsylvania, have invented certain new and useful Improvements in Vehicle Wheels, of which the following is a specification.

My invention consists of an improvement in vehicle wheels, and has for its object to provide, in a wheel of such type, resilient means for absorbing the shocks and jars of impact and the various strains incident to vehicle wheels, especially those used with motor vehicles. In my invention I utilize a main annular spiral spring incorporated between the central hub and its spokes and the outer shoe or tread in a manner providing for operative connection between the hub and shoe as to traction imparting, braking, or other strains, and whereby the annular spring member will operate to absorb the various shocks incident to road travel.

In the drawings, which show one preferred embodiment of the invention:

Fig. 1 is a fragmentary drawing in side elevation and section, partly broken away, showing the construction;

Fig. 2 is a cross section on the line II—II of Fig. 1;

Fig. 3 is a detail sectional view showing a connection between the spring spiral and the felloe; and Fig. 4 is a sectional detail view showing additional reinforcing connections between the felloe and rim.

In the drawing, 2 is the hub member of any suitable construction, as disks, provided with annular flanges 3 for connection with spokes 4 and adapted for mounting on a central journal member of suitable form.

The tire member, as shoe 5, may be of any convenient design, and the spokes 4 are connected to an inner annular felloe 6 as shown.

In the construction herein disclosed, the spring 7 is continuously annular around the wheel, composed of spiral coils suitably spaced and of the desired gauge and temper to provide the proper resilience and strength, dependent on the load or other conditions of use. Spring 7 is interposed between the felloe 6 and an outer tire rim 8, preferably connected directly to the spring by suitable clips 9, as in Fig. 3, similar clips 10 connecting the spring with the felloe, although any other suitable means may be employed, if preferred.

For the purpose of bracing the spring against collapsing lengthwise of its annular direction, and of reinforcing it against the various strains of load pressure, traction, etc., I connect the spirals at intervals by tie members 11 secured to and extending transversely across between the outer and inner portions of some or all of the coils, as shown in Fig. 1. The tie members may be of wire, twisted around the coils by their terminals 12, and are continued throughout, in opposite diagonal directions, crossing each other within the coils and tending to maintain the coils of the spring erect throughout its entire circumference.

While ordinarily, the bracing reinforcements above described are sufficient to connect the felloe 6 with the rim 8 for transmission of the strains involved in usual service, I have shown additional tie rods or wires 11ª extending diagonally with relation to the curvature of the wheel and across in opposing directions through the spring member 7 and its associated filling and surrounding body portions 13 and 14. These rods are secured to the felloe and rim in any suitable manner, as by passing their terminals through suitable holes and clinching them over, as at 12ª, whereby to continuously tie the parts together.

As a further reinforcement, the space within the spring and between its coils is filled with a body 13 of soft rubber or similar composition, and the entire spring and its associated members is surrounded and enclosed within an outer tubing 14, also of rubber or the like, preferably reinforced with fabric. The latter is preferably vulcanized to harden it and also fuse it with the outer portion of the filling body 13, the vulcanizing process extending inwardly to a greater or less extent, whereby to provide a comparatively hard enveloping and closely intimate attachment with the coils 7. By this construction, the spiral spring is not only completely invested within the rubber body whereby to continuously maintain their relationship, but the resiliency of each is modified and supplemented by the other. The result in action is to provide a cushioned wheel of ample strength and resiliency capable of absorbing and modifying the usual shocks, and obviating the necessity of the usual pneumatic tire.

A further advantage in surrounding and imbedding the coiled spring in the rubber or rubber-like body is that it is prevented from vibration or rattling and resulting crystallization. The rubber may be so compounded that the stock next to the metal elements will vulcanize and become very tough and resistant, adhering closely to it and preventing separation or rupture, with fixed connection to the spring and brace wires.

The wheel may be proportioned as to its several parts to suit the conditions of use as to strength, size, and spacing of the springs, their tie members, quality of the rubber, etc., and the device may be variously changed or modified in different details of construction by the skilled mechanic, but all such changes are to be considered as within the scope of the following claims.

What I claim is:

1. A resilient member for a vehicle wheel consisting of an annular spiral spring having interior braces connecting the spirals.

2. A resilient member for a vehicle wheel consisting of an annular spiral spring having outer portions of some of the spirals connected with inner portions of other spirals by attached bracing members.

3. A resilient member for a vehicle wheel consisting of an annular spiral spring having outer portions of some of the spirals connected with inner portions of other spirals by attached bracing members arranged in opposite directions.

4. A resilient member for a vehicle wheel consisting of an annular spiral spring having interior cross braces connecting coils of the spring at opposite sides of its periphery.

5. A resilient member for a vehicle wheel consisting of an annular spiral spring having a filling and investing body of resilient material completely enclosing the spring and hardened at its outer portion.

6. A resilient member for a vehicle wheel consisting of an annular spiral spring embedded in an inner body of rubber and an outer enclosing lamina integral therewith.

7. A resilient member for a vehicle wheel consisting of an annular spiral spring having an inner body of rubber and an outer enclosing lamina vulcanized thereon.

8. A resilient member for a vehicle wheel consisting of an annular spiral spring having a filling of resilient material and interior braces connecting the spirals.

9. In combination, an annular spiral spring, tie members connecting outer portions of some of the spiral coils thereof with inner portions of other spiral coils, and a continuous filling of resilient material.

10. In combination, an annular spiral spring, tie members connecting outer portions of some of the spiral coils thereof with inner portions of other spiral coils, a continuous filling of resilient material, and an outer enclosing lamina.

11. The combination with a central hub, a felloe and an outer shoe and rim, of an intervening annular spiral spring connected with the felloe and rim respectively and having an interior cushioning substance.

12. The combination with a central hub, a felloe and an outer shoe and rim, of an intervening annular spiral spring connected with the felloe and rim respectively and having an interior cushioning substance, and transverse bracing elements connecting the spirals at intervals.

13. The combination with a central hub, a felloe, and an outer shoe, of an intervening annular spiral spring provided with a filler and cover of resilient material, spokes connecting the felloe and hub, and an outermost shoe surrounding the spiral spring member.

14. The combination with a central hub and an outer shoe, of an intervening annular spiral spring provided with a filler and cover of resilient material, a felloe connected with the spiral spring member, spokes connecting the felloe and hub, an outer rim member connected with the spiral spring member, and an outermost shoe mounted on the rim.

15. In a vehicle wheel, the combination with the felloe and rim and an interposed annular spring member, of tie members extending diagonally with relation to the curvature of the wheel, connecting the felloe and rim and passing through the spring member.

16. In a vehicle wheel, the combination with the felloe and rim and an interposed annular spring member, of tie members extending diagonally with relation to the curvature of the wheel, connecting the felloe and rim and passing through the spring member in opposing directions.

In testimony whereof I hereunto affix my signature.

SMITH A. HOGE.